July 17, 1962 R. P. BURR ETAL 3,044,695

ELECTRO-OPTICAL SYSTEM

Filed March 2, 1960 4 Sheets-Sheet 1

INVENTORS
ROBERT P. BURR
RAYMOND J. KEOGH
BY
Charles A. Blank
ATTORNEY

July 17, 1962 R. P. BURR ET AL 3,044,695

ELECTRO-OPTICAL SYSTEM

Filed March 2, 1960 4 Sheets-Sheet 2

INVENTORS
ROBERT P. BURR
RAYMOND J. KEOGH
BY
Charles A. Blank
ATTORNEY

July 17, 1962 R. P. BURR ETAL 3,044,695

ELECTRO-OPTICAL SYSTEM

Filed March 2, 1960 4 Sheets-Sheet 3

INVENTORS
ROBERT P. BURR
RAYMOND J. KEOGH

BY Charles A. Blank

ATTORNEY

July 17, 1962 R. P. BURR ETAL 3,044,695

ELECTRO-OPTICAL SYSTEM

Filed March 2, 1960 4 Sheets-Sheet 4

INVENTORS
ROBERT P. BURR
RAYMOND J. KEOGH
BY
Charles A. Blank
ATTORNEY

United States Patent Office 3,044,695

Patented July 17, 1962

3,044,695

ELECTRO-OPTICAL SYSTEM

Robert P. Burr, Lloyd Harbor, Huntington, and Raymond J. Keogh, Huntington, N.Y., assignors to Circuit Research Company, Cold Springs Harbor, N.Y., a partnership Filed Mar. 2, 1960, Ser. No. 12,411
7 Claims. (Cl. 235—61.11)

This invention relates to electro-optical systems and, more particularly, to systems for use in tape-reading apparatus for developing pulses in accordance with perforations of a tape.

Prior tape readers have been proposed which derive electrical pulses from the perforations of a tape to represent a message or information code. The tape utilized by some tape readers also has a series of perforations representing pulses for controlling the driving mechanism for the tape. In particular, in a tape reader using a printed-circuit motor of the type described in a co-pending application of F. H. Raymond and J. Henry-Baudot, Serial No. 691,434, filed October 21, 1957 and entitled "Electrical Rotating Machines," control pulses are derived from the tape to control the energization and de-energization of the motor to start and stop the tape to allow the message code to be read. A tape reader of this type is described in the French publication "Electronique Industrielle" No. 22, September-October 1958.

In prior tape readers of the type described, the motor control circuits must be re-adjusted to operate properly with each different type of tape having a different light-transmission value for the body of the tape. For example, a metallized opaque tape has a light-transmission value or reference level through the body of the tape of zero while an oily paper tape may have a light-transmission value or reference level of 50%, transmitting through its body 50% of the light intensity striking it. Because of the high light-transmission value of the oily paper tape, the photo-cell of the tape reader generates a substantial current when covered by the body of the tape, thereby reducing the amplitude of the current change in the photo-cell which indicates a tape perforation. Also, the average direct current or reference level of the current pulses shifts in accordance with the light-transmission value of the tape as a result of the undesired current which flows while the body of the tape covers the photo-cell.

It is an object of the present invention, therefore, to provide a new and improved electro-optical system for use in apparatus for developing pulses representative of a tape having in its light-transmission characteristic discrete discontinuities which represent pulses.

It is another object of the invention to provide a new and improved electro-optical system for use in a tape reader for developing pulses representative of perforations of a tape, which system develops output pulses independent of the light-transmission value of the type of tape utilized.

In accordance with a particular form of the invention, in apparatus for developing pulses as determined by a tape having in its light-transmission characteristic discrete discontinuities which represent pulses, an electro-optical system comprises means responsive to changes in light transmitted through the tape for developing electrical pulses representative of the light-transmission discontinuities of the tape. The pulses have an electrical reference level determined by the reference level of the light-transmission characteristic of the tape. The system also includes means responsive to light transmitted through the tape as determined by the reference level of the light-transmission characteristic of the tape for developing an electrical signal representative of the reference level of the light-transmission characteristic of the tape. The system also includes means for combining the aforesaid electrical pulses and the aforesaid electrical signal for developing resultant pulses having an electrical reference level which is substantially independent of the reference level of the light-transmission characteristic of the tape.

For a better understanding of the present invention, together with other and further objects thereof, reference is made to the following description taken in connection with the accompanying drawings, and its scope will be pointed out in the appended claims.

Referring now to the drawings.

Figure 1:
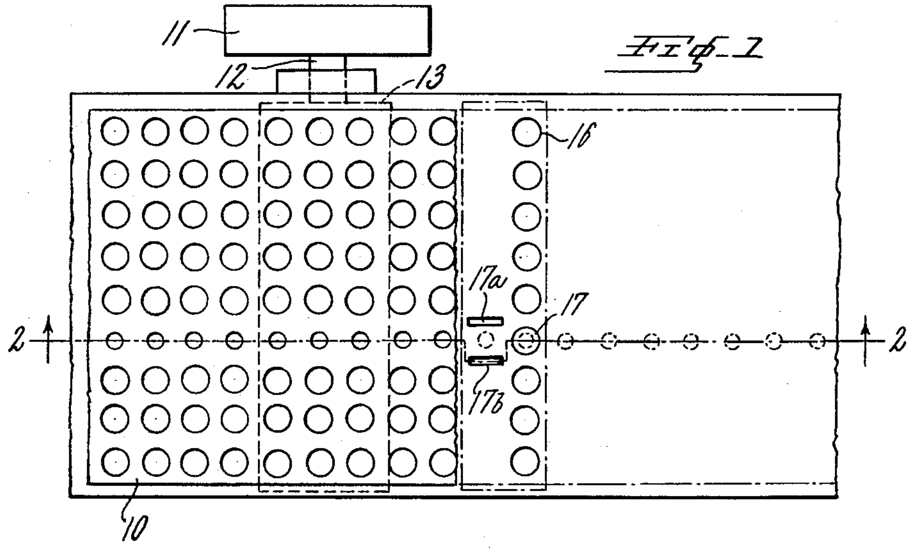
FIG. 1 is a fragmentary plan view, partly diagrammatic, of an electro-optical system constructed in accordance with the invention.
Figure 2:
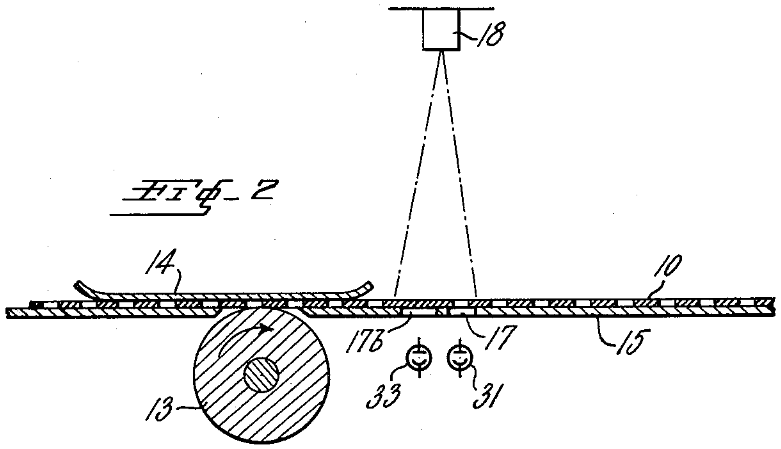
FIG. 2, is a sectional view, partly diagrammatic, of FIG. 1 system, taken along line 2—2 of FIG. 1.
Figure 2A:
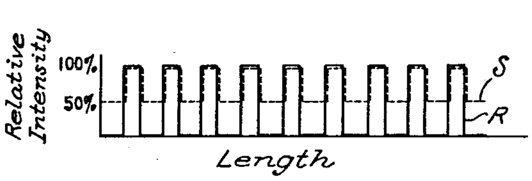
Figure 3:
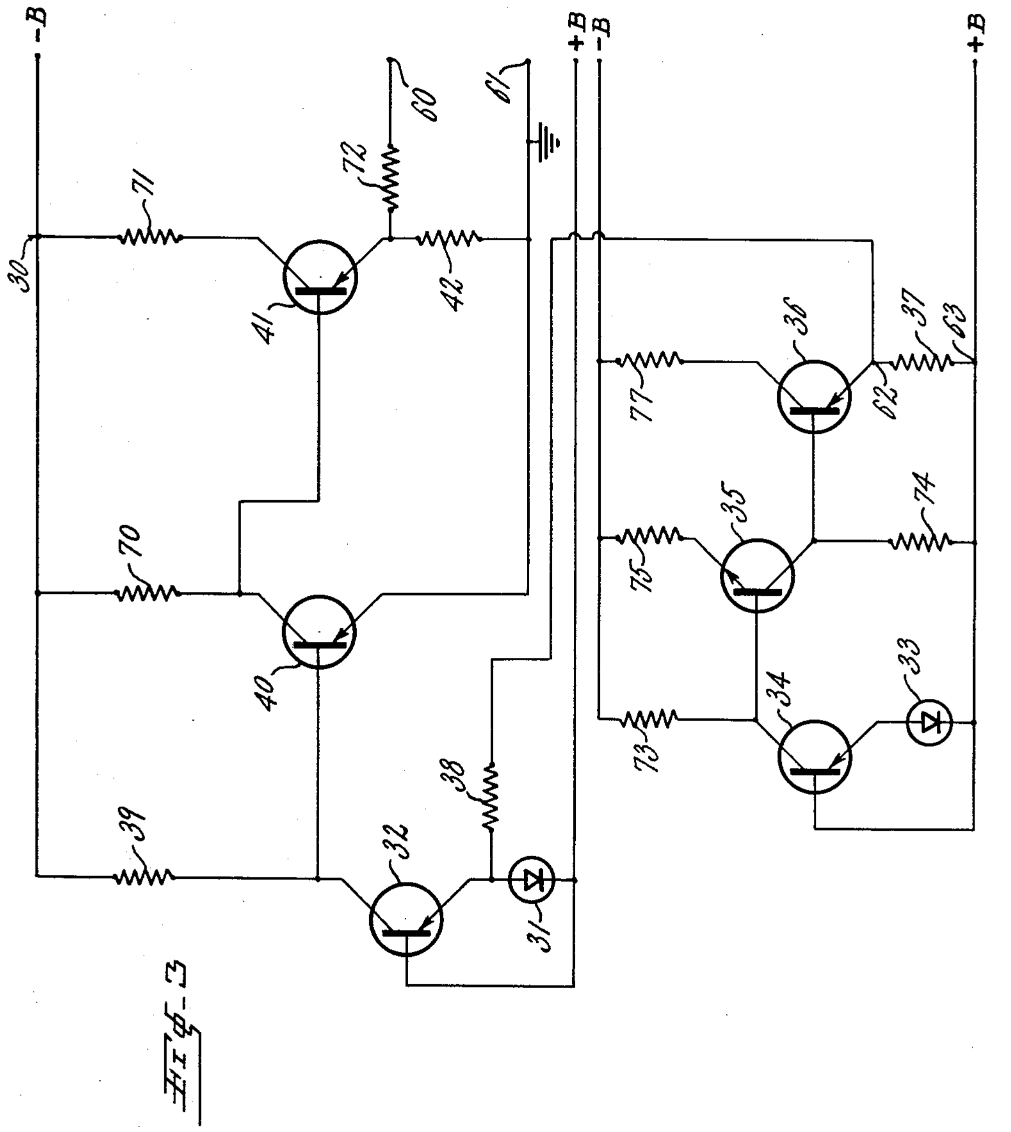
Figure 3A:
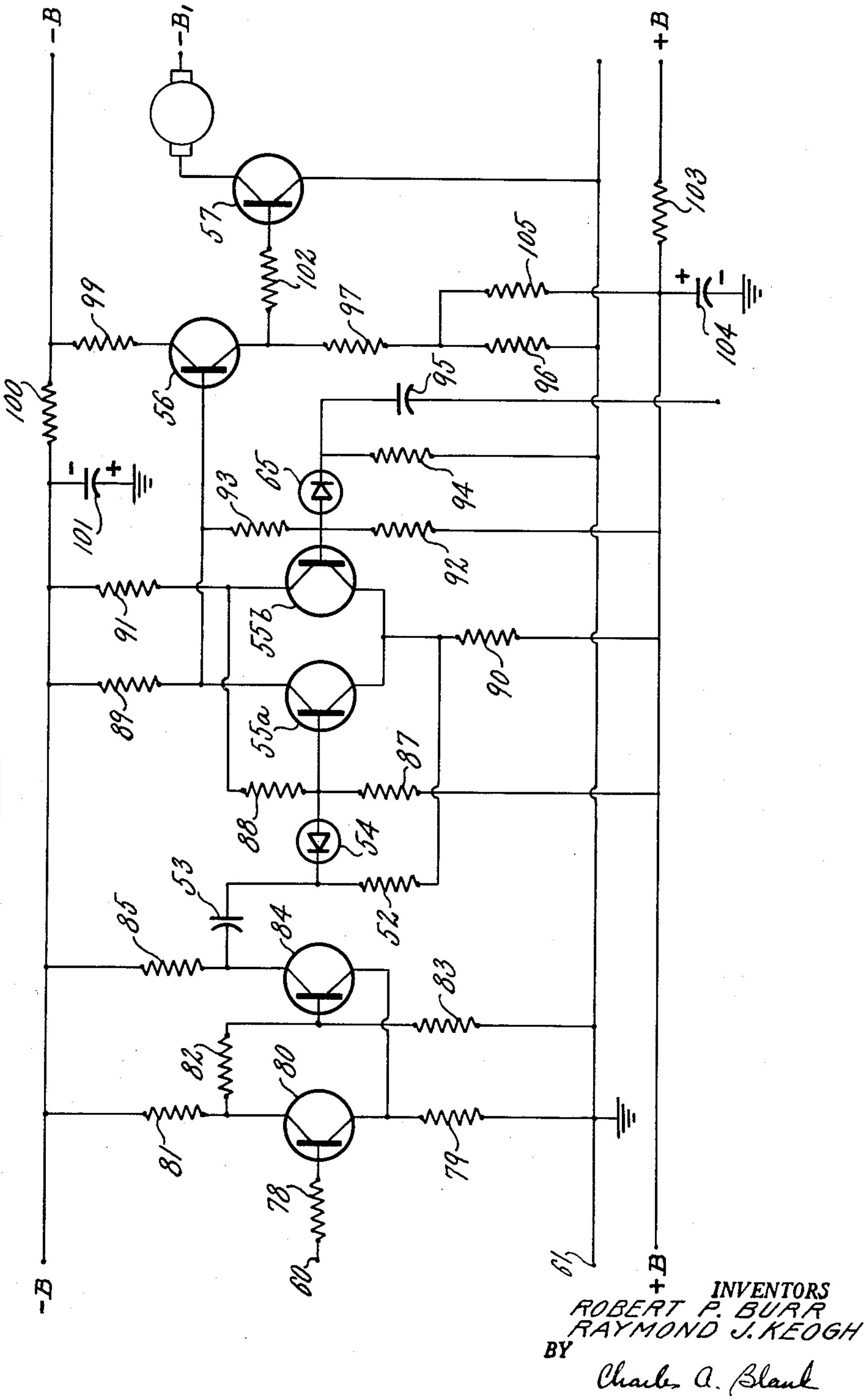
Figure 4:
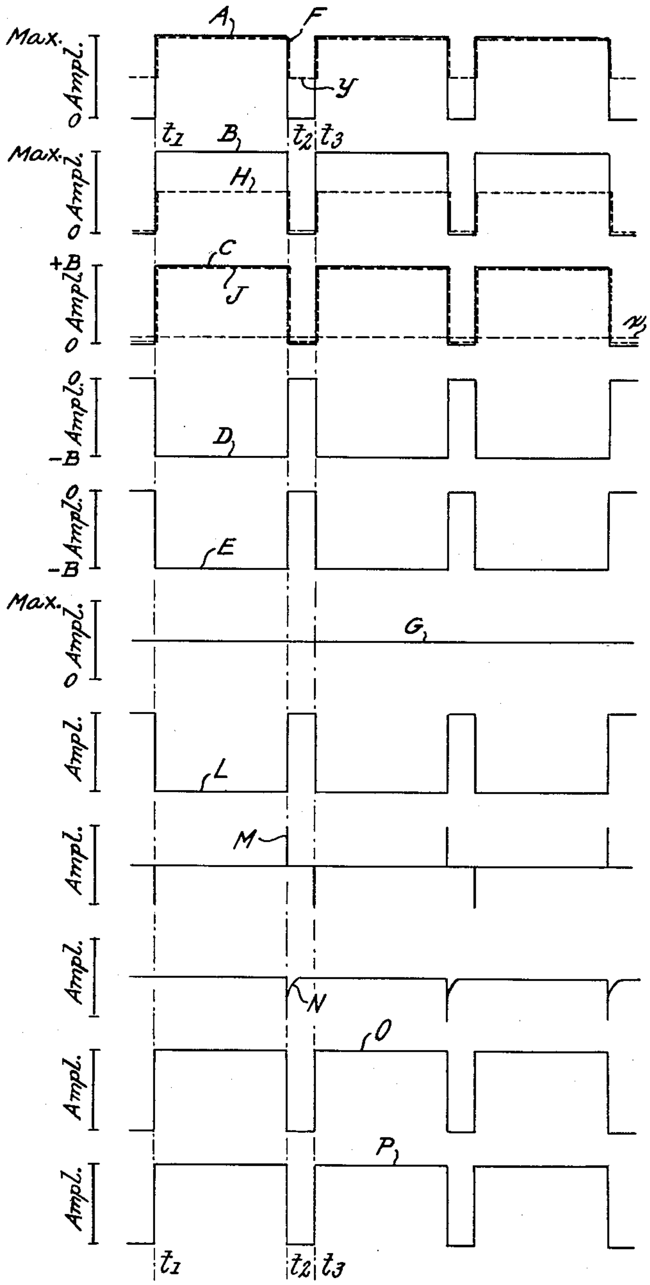

FIG. 2*a* is a graph representing the light-transmission characteristics of two representative tapes;

FIG. 3 is a circuit diagram representing a portion of the system constructed in accordance with the invention;

FIG. 3*a* is a circuit diagram representing a portion of tape-reader apparatus utilizing the FIG. 1 system; and FIG. 4 is a graph representing the amplitude-time characteristics of signals developed in the circuits of FIGS. 3 and 3*a* to aid in explaining the operation thereof.

Referring now more particularly to FIGS. 1 and 2 of the drawings, a perforated tape 10 is driven by means of a motor 11 having on its shaft 12 a suitable roller 13, sliding the tape along, for example, a shoe 14 or suitable idler roller. A surface member or plate 15 over which the tape 10 travels has a series of apertures 16 for reading the message code of the tape and has an aperture 17 in alignment with those perforations of the tape which control the starting and stopping of the drive motor.

One or more slots **17*a* and 17*b* continuously covered by the body of the tape are disposed in the plate 15 near the aperture 17 for a purpose to be explained subsequently. A suitable light source 18 is disposed above the tape and a series of photo-cells (not shown) are disposed below the plate 15 in correspondence with the apertures 16 to respond to light transmitted through the apertures 16. A photo-cell responsive to light transmitted through aperture 17 and a photo-cell responsive to light transmitted through slots 17*a* and 17*b*** are represented diagrammatically in FIG. 2.

FIG. 2*a* is a graph representing the relative light intensity transmitted through the tape, assuming a uniform light source above the length of the tape. Curve R of FIG. 2*a* represents the light-transmission characteristic of an opaque tape, that is, a tape having an opaque body, taken along the line 2—2 through the perforations which control the starting and stopping of the motor. Curve S of FIG. 2*a* represents the light-transmission characteristic of an oily paper tape having a light transmission reference level of, for example 50%.

Referring now more particularly to FIGS. 3 and 3*a* of the drawings, an electro-optical system in accordance with the invention comprises means responsive to changes in light transmitted through the tape for developing electrical pulses representative of the light-transmission discontinuities of the tape, the pulses having an electrical reference level determined by the reference level of the light-transmission characteristic of the tape. More particularly, this means comprises, for example, a photo-cell 31 responsive to changes in intensity of the light transmitted through the tape for developing current pulses representative thereof.

The electro-optical system also includes means responsive to light transmitted through the tape as determined by the reference level of the light-transmission characteristic of the tape for developing an electrical signal representative of the reference level of the light-transmission characteristic of the tape. More particularly, this means comprises a photo-cell 33 responsive to light transmitted through the body of the tape as determined by the light-transmission value of the body of the tape for developing an average or direct-current reference signal. The photo-cell 33 is directly connected to the emitter of a PNP transistor 34 having its collector connected to the base of NPN transistor 35. The collector of the transistor 35 is connected to the base of a PNP transistor 36 having an emitter output circuit including a resistor 37 for developing across the resistor 37 a potential which is proportional to the light-transmission reference level of the body of the tape.

The electro-optical system also includes means for combining the electrical pulses developed by the photo-cell 31 and the electrical signal developed across resistor 37 for developing resultant pulses having an electrical reference level which is substantially independent of the reference level of the light-transmission characteristic of the tape. More particularly, this means comprises a resistor 38 of large value relative to the impedance of the photo-cell 31 and the output impedance of the transistor 36 for developing a current flow proportional to the light-transmission reference level of the body of the tape, and for combining this current flow with the current flow through the photo-cell 31 to develop resultant current pulses having an electrical reference level which is substantially independent of the reference level of the light-transmission characteristic of the body of the tape.

The electro-optical system preferably also includes means for limiting the amplitude of the resultant pulses to develop output pulses of substantially constant amplitude and substantially independent of the light-transmission characteristic of the body of the tape. More particularly, the limiting means comprises resistor 39 connected to the collector of a PNP transistor 32 and a PNP transistor 40 having its base connected to the collector of the transistor 32. The emitter of the transistor 40 preferably is grounded at a potential intermediate the potentials +B, —B. The collector of the transistor 40 is connected to the base of an amplifier stage including a PNP transistor 41 for developing output pulses across a resistor 42 connected to its emitter.

The tape-reader apparatus includes a regenerative amplifier including transistors 80, 84 for shaping the pulses, and a resistor-condenser differentiating circuit 52, 53 for deriving positive and negative pulses therefrom. The differentiating circuit 52, 53 is connected through a diode 54 to a bi-stable multivibrator including transistors 55*a*, 55*b* for developing pulses applied to the base of a transistor amplifier 56 and a power transistor 57 for stopping the motor which drives the tape.

Considering now the operation of the electro-optical system with reference to FIGS. 3, 3*a* and 4 of the drawings, it will be assumed initially that an opaque tape, such as a metallized tape, is utilized. When the tape perforations are over the aperture 17 of the FIG. 1 surface plate, for example, during interval *t*1–*t*2, the photo-cell 31 develops current pulses represented by curve A of FIG. 4.

When an opaque tape is utilized, no light is transmitted through the tape and the apertures 17*a* and 17*b* to the photo-cell 33. Accordingly, no current flows through the photo-cell 33 and transistor 34. The bias applied to transistor 35 is sufficiently negative to bias the transistor to cutoff, and similarly the bias applied to transistor 36 is effective to bias that transistor to cutoff. Accordingly, no current flows through transistor 36 and a potential +B is applied to resistor 38 at the emitter of transistor 36. A negligibly small current flows through resistor 38 because the potential drop across the photo-cell 31 is negligible and both terminals of the resistor 38 are approximately at the potential +B.

The emitter current flow of transistor 32 is represented by curve B and is substantially identical with the current pulses represented by curve A when an opaque tape is utilized. A component of the current represented by curve B flows between the emitter and base of transistor 32 and a component flows between the emitter and collector, as will be more fully explained hereinafter.

During intervals when the tape body is over the aperture 17, for example, interval *t*2–*t*3, current flows through resistor 39 and between the emitter and base of transistor 40, driving transistor 40 to saturation. This current flow through resistor 39 drops the potential at the collector of transistor 32 approximately to zero, as represented by curve C during the interval *t*2–*t*3.

During intervals when a perforation is over the aperture 17, for example, interval *t*1–*t*2, current flow through the photo-cell 31 and between the emitter and collector of transistor 32 causes substantially the full potential difference from +B to —B to appear across resistor 39. The current flow through the photo-cell 31 less any current flow through the resistor 38 is the net emitter current flow through transistor 32. The emitter-collector current of transistor 32 flowing through resistor 39 raises the potential at the collector of transistor 32 when the aforesaid net current flow exceeds, for example, 140 microamperes, thereby eliminating emitter-base current flow through transistor 40 to cutoff during interval *t*1–*t*2. When the potential drop across resistor 39 becomes substantially equal to the potential difference from +B to —B, an additional component of current flow through photo-cell 31 flows between emitter and base of the transistor 32 during the interval *t*1–*t*2.

As represented by curve C, the potential at the collector of transistor 32 during the occurrence of a perforation over the aperture 17 is approximately +B and is more positive than the emitter potential of the transistor 40, represented by line *x*. Accordingly, there are developed at the collector of transistor 40 negative pulses of limited amplitude represented by curve D, for example, during interval *t*1–*t*2, which are, in turn, translated through an emitter-follower transistor 41 and developed as output pulses represented by curve E at terminals 60, 61. These pulses are translated through the motor-control circuits of FIG. 3*a* in a manner to be described subquently.

When an oily paper tape is utilized, the photo-cell 31 develops current pulses represented by broken-line curve F during time interval *t*1–*t*2. The pulses are of smaller amplitude than the pulses for an opaque tape because light is transmitted through the body of the tape establishing a higher current reference level *y* during time *t*2–*t*3.

When an oily paper tape is utilized, light is transmitted through the body of the tape to photo-cell 33 to develop an average current flow which is proportional to the intensity of light transmitted. This current flow is amplified through transistors 34, 35, and 36 to develop across resistor 37 a potential at terminal 62 with respect to terminal 63 which is proportional to the light-transmission value of the body of the tape. This potential at terminal 62 becomes increasingly negative with tapes which are more transparent. The potential drop across the photo-cell 31 is negligible. Accordingly, there flows through resistor 38 a current, represented by curve G, which is proportional to the light-transmission value or reference level of the tape and which is of the same value as the corresponding component of current flow developed by photo-cell 31. Accordingly, a component of current flow through photo-cell 31 representing the light-transmission reference level of the body of the tape is diverted to flow through resistor 38 with the result that the emitter current flow through transistor 32 during the intervals when the body of the tape covers the aperture 17, for example, interval *t*2–*t*3, is substantially the same as the current flow through transistor 32 when an opaque tape is utilized, as represented by curve H. The amplitude of the current pulses represented by curve H is sufficient to develop voltage pulses represented by curve J. The voltage pulses represented by curve J are developed by the emitter-collector component of the net emitter-current flow through the transistor 32. Any remaining component of the net emitter-current flows between the emitter and base of the transistor 32. The pulses represented by curve J are more positive than the emitter potential of the transistor 40 to accomplish limiting by means of the transistor 40. This provides the result that pulses represented by curves D and E are derived with the same reference level and the same amplitude independent of the light-transmission value of the body of the tape as previously described in connection with the use of an opaque tape in the system.

The output pulses represented by curve E are supplied to the regenerative amplifier 80, 84 which develops amplified and limited pulses represented by curve L. The pulses represented by curve L are, in turn, differentiated in resistor-condenser network 52, 53 to develop pulses represented by curve M. The negative pulses of curve M are applied through diode 54 to the bi-stable multivibrator to drive transistor **55*a* into conduction and to cut off transistor 55*b*** with the occurrence of each pulse of curve M.

Start pulses represented by curve N are applied through diode 65 to the multivibrator **55*a*, 55*b* intervening the pulses of curve M at a frequency of, for example, 20 pulses per second to switch the multivibrator to its original condition. Accordingly, output pulses represented by curve O are developed at the collector of transistor 55*a* and applied to the base of transistor 56 to develop an output signal at the emitter of transistor 56 represented by curve P. Thus, the pulses represented by curve P control the bias of power transistor 57 to render the transistor 57 nonconductive and stop the motor 11** during the intervals, such as interval *t1–t2*, when the perforations are over the aperture and to drive the motor during the intervening intervals such as interval *t2–t3*.

The message-code pulses may be read by photo-cells (not shown) responsive to light through the remaining apertures 16 and the voltage developed across resistor 37 may be applied to several resistors similar to the resistor 38 to develop correction signals for the individual channels (not shown) which amplify the message-code pulses.

While applicants' invention is not limited to any particular parameters or circuit constants, the following have been found to provide satisfactory operation in the embodiment described.

| | |
|---|---|
| Photo-cell **31** | Type HPC–9–01. |
| Photo-cell **33** | Type HPC–9–01. |
| Transistor **32** | Type 2N192. |
| Transistor **34** | Type 2N192. |
| Transistor **35** | Type 2N241. |
| Transistor **36** | Type 2N241. |
| Transistor **40** | Type 2N241. |
| Transistor **41** | Type 2N241. |
| Transistor **80** | Type 2N241. |
| Transistor **84** | Type 2N241. |
| Transistor **55*a*** | Type 2N241. |
| Transistor **55*b*** | Type 2N241. |
| Transistor **56** | Type 2N392. |
| Transistor **57** | Type 2N278. |
| Diode **54** | Type HD2135. |
| Diode **65** | Type HD2135. |
| Resistor **38** | 47 kilohms. |
| Resistor **39** | 100 kilohms. |
| Resistor **42** | 10 kilohms. |
| Resistor **52** | 10 kilohms. |
| Resistor **70** | 2.2 kilohms. |
| Resistor **71** | 33 ohms. |
| Resistor **72** | 100 ohms. |
| Resistor **73** | 27 kilohms. |
| Resistor **74** | 10 kilohms. |
| Resistor **75** | 6.8 kilohms. |
| Resistor **77** | 470 ohms. |
| Resistor **78** | 1 kilohms. |
| Resistor **79** | 470 ohms. |
| Resistor **81** | 2.7 kilohms. |
| Resistor **82** | 6.8 kilohms. |
| Resistor **83** | 2.7 kilohms. |
| Resistor **85** | 2.2 kilohms. |
| Resistor **87** | 10 kilohms. |
| Resistor **88** | 10 kilohms. |
| Resistor **89** | 470 ohms. |
| Resistor **90** | 33 ohms. |
| Resistor **91** | 470 ohms. |
| Resistor **92** | 4.7 kilohms. |
| Resistor **93** | 4.7 kilohms. |
| Resistor **94** | 10 kilohms. |
| Resistor **96** | 15 ohms. |
| Resistor **97** | 220 ohms. |
| Resistor **99** | 5.6 ohms. |
| Resistor **100** | 15 ohms. |
| Resistor **100** | 15 ohms. |
| Resistor **102** | 15 ohms. |
| Resistor **103** | 15 ohms. |
| Resistor **105** | 150 ohms. |
| Condenser **53** | .05 microfarad. |
| Condenser **95** | .05 microfarad. |
| Condenser **101** | 100 microfarad. |
| Condenser **104** | 100 microfarad. |
| Source —B | —14 volts. |
| Source +B | +3 volts. |
| Source $-B_1$ | —5.6 volts. |
| Motor **11** | Printed motors, Inc., type PM368A. |

From the foregoing description, it will be apparent that an electro-optical system constructed in accordance with the invention has the advantage that the apparatus is responsive without re-adjustment to pulses represented by perforations of tapes having light-transmission values which may differ over a wide range. The apparatus utilizes direct-coupled transistor circuits of inexpensive construction and is suitable for commercial manufacture.

While there has been described what is at present considered to be the preferred embodiment of this invention, it will be obvious to those skilled in the art that various changes and modifications may be made therein without departing from the invention, and it is therefore, aimed to cover all such changes and modifications as fall within the true spirit and scope of the invention.

Having thus described our invention, what we claim and desire to protect by Letters Patent is:

1. In apparatus for developing pulses as determined by a tape having in its light-transmission characteristic discrete discontinuities which represent pulses, an electro-optical system comprising: means responsive to changes in light transmitted through said tape for developing electrical pulses representative of the light-transmission discontinuities of said tape, said pulses having an electrical reference level determined by the reference level of the light-transmission characteristic of said tape; means responsive to light transmitted through said tape as determined by said reference level of said light-transmission characteristic for developing an electrical signal representative of said reference level of said light-transmission characteristic; and means for combining said electrical pulses and said electrical signal for developing resultant pulses having an electrical reference level which is substantially independent of said reference level of said light-transmission characteristic of said tape.

2. In apparatus for developing pulses as determined by perforations of a tape, an electro-optical system comprising: means responsive to changes in the intensity of light transmitted through said tape for developing electrical pulses representative of the perforations of said tape, said pulses having an electrical reference level determined by the light-transmission reference level of the body of said tape; means responsive to the intensity of light transmitted through said body of said tape for developing an electrical signal representative thereof; and means for combining said electrical pulses and said electrical signal for developing resultant pulses having an electrical reference level which is substantially independent of the intensity of light transmitted through said body of said tape.

3. In apparatus for developing pulses as determined by a tape having in its light-transmission characteristic discrete discontinuities which represent pulses, an electro-optical system comprising: means responsive to changes in light transmitted through said tape for developing electrical pulses representative of the light-transmission discontinuities of said tape, said pulses having an electrical reference level determined by the reference level of the light-transmission characteristic of said tape; means responsive to light transmitted through said tape as determined by said reference level of said light-transmission characteristic of said tape for developing an electrical signal representative of said reference level of said light-transmission characteristic of said tape; means for combining said electrical pulses and said electrical signal for developing resultant pulses having an electrical reference level which is substantially independent of the reference level of said light-transmission characteristic of said tape, and means for limiting the amplitude of said resultant pulses to develop output pulses of substantially constant amplitude and substantially independent of said light-transmission characteristic of said body of said tape.

4. In apparatus for developing pulses as determined by perforations of a tape which represent pulses, an electro-optical system comprising: means responsive to changes in the intensity of light transmitted through said tape for developing electrical pulses representative of the perforations of said tape, said pulses having an electrical reference level determined by the light-transmission reference level of the body of said tape; means responsive to the intensity of light transmitted through said body of said tape for developing an electrical signal representative thereof; means for combining said electrical signal and said electrical pulses for developing resultant pulses having an electrical reference level which is substantially independent of the intensity of light transmitted through the body of said tape; and means for limiting the amplitude of said resultant pulses representing said perforations of said tape to develop output pulses representing said perforations having a substantially constant amplitude and substantially independent of the intensity of light transmitted through said body of said tape.

5. In apparatus for developing pulses as determined by perforations of a tape which represent pulses, an electro-optical system comprising: a surface member having at least one aperture disposed for alignment with successive perforations of said tape and having at least a second aperture continuously covered by the body of said tape;

means including a photo-cell responsive to the intensity of light transmitted through said first aperture for developing electrical pulses representative of the perforations of said tape, said pulses having an electrical reference level determined by the light-transmission reference level of said body of said tape; means responsive to the intensity of light transmitted through said second aperture for developing an electrical signal representative of the light-transmission reference level of said body of said tape; and means for combining said electrical pulses and said electrical signal for developing resultant pulses having an electrical reference level which is substantially independent of said light-transmission reference level of said body of said tape.

6. In apparatus for developing pulses as determined by perforations of a tape which represent pulses, an electro-optical system comprising: means responsive to changes in the intensity of light transmitted through the perforations of the tape for developing current pulses representative of said perforations of said tape, said current pulses having an electrical reference level determined by the light-transmission reference level of said body of said tape; means responsive to light transmitted through said body of said tape for developing a potential representative of said light-transmission reference level of said body of said tape; and means for developing a direct current flow proportional to said potential and for effectively subtracting said direct current flow from said current pulses for developing resultant current pulses having an electrical reference level which is substantially independent of the intensity of light transmitted through said body of said tape.

7. In apparatus for developing pulses as determined by perforations of a tape which represent pulses, an electro-optical system comprising: a surface member having at least one aperture disposed for alignment with successive perforations of said tape and having at least a second aperture continuously covered by the body of said tape; circuit means including a photo-cell responsive to the intensity of light transmitted through said first aperture for developing current pulses representative of the perforations of said tape, said pulses having an electrical reference level determined by the light-transmission reference level of said body of said tape; circuit means including a photo-cell responsive to the intensity of light transmitted through said second aperture for developing a potential representative of said light-transmission reference level of said body of said tape; circuit means for developing a direct current flow proportional to said potential and for effectively subtracting said direct current flow from said current pulses for developing resultant current pulses having an electrical reference level which is substantially independent of the intensity of light transmitted through said body of said tape; and means for limiting the amplitude of said resultant pulses to develop output pulses of substantially constant amplitude.

No references cited.